United States Patent [19]

Kozuki et al.

[11] Patent Number: 4,691,256
[45] Date of Patent: Sep. 1, 1987

[54] INFORMATION REPRODUCING APPARATUS

[75] Inventors: Susumu Kozuki, Tokyo; Hiroyuki Takimoto, Kanagawa; Hiroo Edakubo, Tokyo; Nobutoshi Takayama, Kanagawa, all of Japan

[73] Assignee: Canon Kabushiki Kaisha, Tokyo, Japan

[21] Appl. No.: 856,708

[22] Filed: Apr. 28, 1986

Related U.S. Application Data

[62] Division of Ser. No. 563,663, Dec. 20, 1983, Pat. No. 4,594,618.

[30] Foreign Application Priority Data

Dec. 24, 1982 [JP] Japan .................................. 57-230445
Feb. 2, 1983 [JP] Japan ................................... 58-15581

[51] Int. Cl.$^4$ .............................................. G11B 15/52
[52] U.S. Cl. ..................................................... 360/73
[58] Field of Search ............................. 360/70, 73, 77

[56] References Cited

U.S. PATENT DOCUMENTS

| | | |
|---|---|---|
| 4,044,389 | 8/1977 | Oldershaw et al. ................. 360/73 |
| 4,086,635 | 4/1978 | Saitoci ..................................... 360/73 |
| 4,338,640 | 7/1982 | Yabu et al. ............................ 360/73 |
| 4,344,095 | 8/1982 | Furuta .................................... 360/73 |
| 4,364,097 | 12/1982 | DeBoer et al. ........................ 360/70 |
| 4,550,345 | 10/1985 | Terada et al. ......................... 360/73 |

Primary Examiner—George G. Stellar
Attorney, Agent, or Firm—Toren, McGeady & Associates

[57] ABSTRACT

An information reproducing apparatus including a transporting portion for moving a tape-shaped recording medium at one of at least two different speeds, a reproducing head for reproducing the informations from the recording medium as it is run by the transporting portion, and a detecting portion for detecting whether or not the speed of movement of the recording medium during reproduction is coincident with that of the recording medium during recording the informations.

11 Claims, 19 Drawing Figures

INFORMATION REPRODUCING APPARATUS

This is a division of application Ser. No. 563,663, filed Dec. 20, 1983, now U.S. Pat. No. 4,594,618.

BACKGROUND OF THE INVENTION

1. Field of the Invention:

This invention relates to apparatus for reproducing the informations from a tape-shaped recording medium which was run at two or more different speeds during recording. As such reproducing apparatus, there may be considered magnetic recording and reproducing apparatus, optical reproducing apparatus and many more various types of apparatus. The description will be, however, chiefly made of an example of the type of apparatus for reproducing video information from a magnetic tape on which television signals have been recorded, or a video tape recorder (hereinafter referred to as "VTR").

2. Description of the Prior Art:

Recently, high density magnetic recording has become possible, and VTRs capable of making long-time recording and reproducing have been developed and commercially manufactured.

These, for adaptation to the conventional format too, are made to operate with various selected time modes, for example, standard and long ones, during recording and reproduction in a single VTR item. In order to reproduce the picture recorded on the magnetic tape by such a dual time mode operating VTR, it is necessary that the same time mode be set up as was used in the recording operation. Otherwise, because the time mode would be different, a disturbed picture would be reproduced. Manual choosing of the required reproduction time mode while observing the reproduced images is very inconvenient to the user. On this account, according to the prior art, when recording, the tape is given one control signal (hereinafter referred to as "CTL" signal) for every one frame at the vicinity thereof. Then when reproducing, the number of revolutions of the capstan motor proportional to the distance the magnetic tape has run is sensed with a pulse generator, and how many pulses have been produced in the time interval of occurrence of the CTL signal is counted to examine whether or not the time mode is different between the recording and the reproduction. Upon detection of the difference, the preliminary setting of the time mode is automatically changed over.

Figure 1:
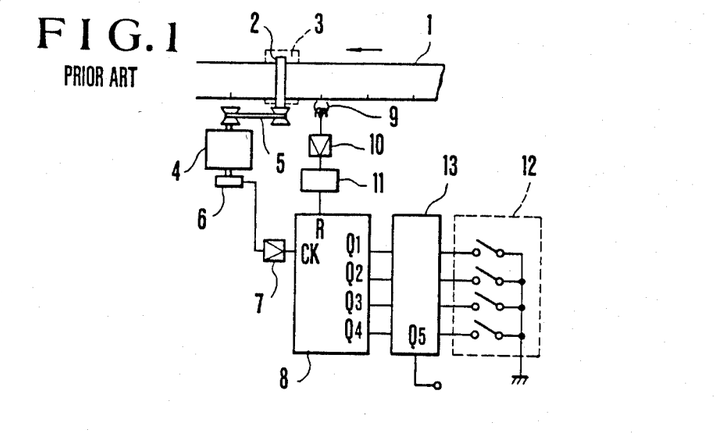
FIG. 1 illustrates a prior art technique.

Here such prior art is described by way of example with reference to FIG. 1. A magnetic tape 1 is moved in a direction indicated by arrow by a capstan 2 and a pinch roller 3.

The video signal, which has been recorded on tracks inclined to the length of the magnetic tape 1 by a rotating magnetic head (not shown) fixedly carried on a rotary drum as is well known in the art, is reproduced from the magnetic tape 1. The capstan 2 is driven by a motor 4 through an endless belt 5 to rotate at a prescribed speed. To sense the speed of rotation of the capstan motor 4, there is a frequency generator 6 of which output pulses therefrom proportional in number to the speed of movement of the magnetic tape 1 are applied via an amplifier 7 to a counter 8 at a clock input terminal CK thereof. A control head 9 picks up the CTL signals of repetitive at the frame rate, and its output is applied through an amplifier 10 and a waveform shaper 11 to the "reset" terminal R of the aforesaid counter 8. With such an input stage, the counter 8 recycles counting the number of pulses in a time interval from one to the next CTL signal and its outputs Q1 to Q4 are applied to a magnitude comparator 13 where they are compared with outputs of a reference control 12 in which a number is preset. When this reference number is exceeded, the output Q5 of comparator 13 takes a high level. That is to say, for the standard mode, the number of pulses counter 8 has counted in between the successive two CTL signals is assumed to be 44. Then if the recording has been operated in the long time mode, where the tape speed is halved, the CTL time interval becomes ½ times that of the standard mode. Therefore, when the magnetic tape which has been run at the long time mode during recording, is run at the standard mode during reproduction, the number of pulses counted in every one CTL interval is not 44 as is normal, but only a half of that, or 22. With the reference control 12 having preset therein an intermediate number between 22 and 44, therefore, when no more than the reference number is counted during reproduction at the standard mode, it is found that the recording has been performed in the long time mode. Conversely, when more than the reference number is counted, it is found that the recording was performed in the standard mode.

However, as some of the CTL signals may fail to be recorded, or as formats having nothing to record what is called the control signals from the first are employed, a problem arises that such automatic mode setting does not result.

SUMMARY OF THE INVENTION

With the foregoing in mind, it is an object of the present invention to provide a reproducing apparatus capable of detecting a difference of the running speed of a recording medium during reproduction from that during recording even when no CTL signals were recorded.

More specifically, an object of the invention is to provide a reproducing apparatus having detecting means for detecting whether or not the running speed of a recording medium during reproduction is coincident with the running speed of the recording medium during recording by the reproduction output of reproducing means for reproducing information signals.

Another object of the invention is to provide a reproducing apparatus having control means which upon detection of difference of the running speed during reproduction from that during recording, automatically brings the running speed during reproduction into coincidence with the running speed during recording.

Still another object of the invention is to provide a reproducing apparatus in which, when information is reproduced from a tape-shaped recording medium on which pilot signals such as those disclosed in U.S. Pat. No. 4,297,733 have been recorded, whether or not the running speed during reproduction is coincident with that during recording can be examined by using the reproduced output of said pilot signal.

These and other objects of the present invention will become apparent from the following detailed description with reference to the accompanying drawings.

BRIEF DESCRIPTION OF THE DRAWINGS

FIG. 2 (a)–(c) is a diagram of a first embodiment of the invention where the tape which was run in the long time mode during recording is run in the standard mode during reproduction.

DETAILED DESCRIPTION OF THE PREFERRED EMBODIMENTS

Figure 2:
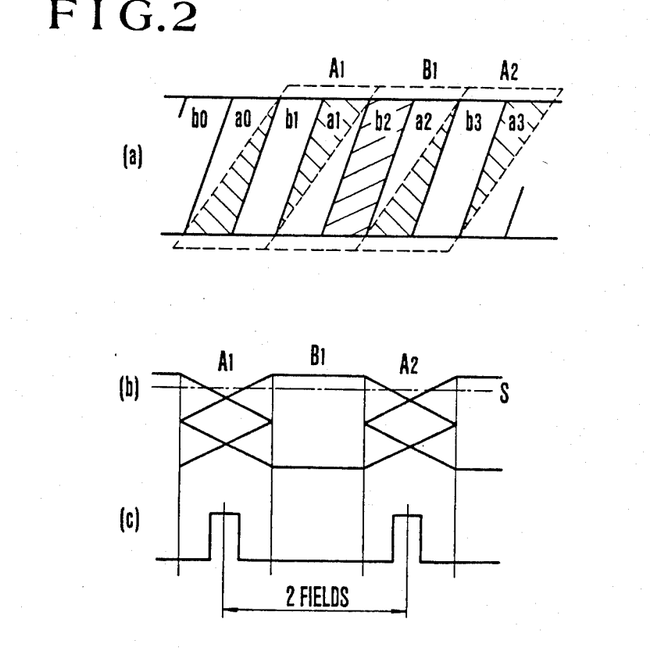
Figure 3:
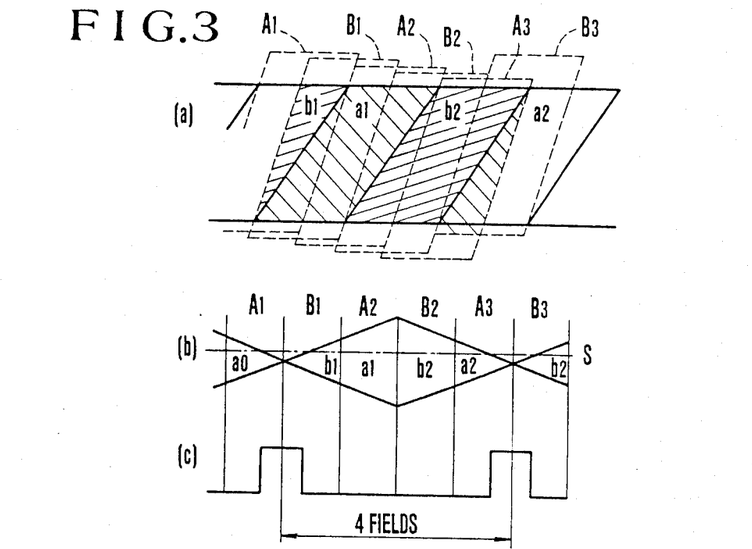
FIGS. 3 and 4, each (a)-(c), are similar to FIG. 2 except that the tape which has been run in the standard mode during recording is run in the long time mode during reproduction.
Figure 4:
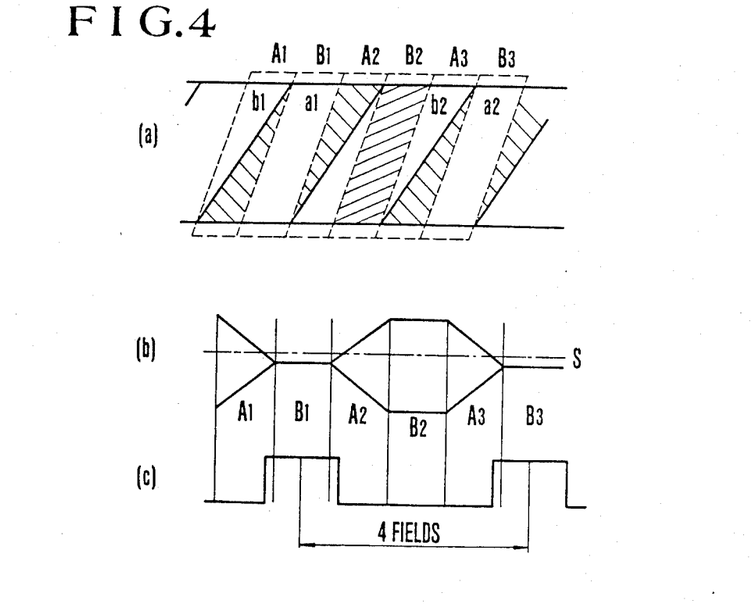

FIGS. 2, 3 and 4 illustrate the principle of the invention, when the helical scan type rotating head is used as a head for recording and reproduction.

FIG. 2(a) illustrates recording tracks on a magnetic tape of which a0, a1 ... have been recorded by a recording head of plus azimuth, and b0, b1, ... by another head of minus azimuth, and which has been run in the long time mode. Against this, suppose reproducing is operated in the standard mode on assumption that the running speed of the tape in the long time mode is $\frac{1}{2}$ times that in the standard mode, and the width of the recording and reproducing head for the long time mode is $\frac{1}{2}$ times that of the reproducing head for the standard mode.

When reproducing is operated in the standard mode, therefore, the heads trace as shown by dashed lines. A1, A2, ... are tracing paths of the plus azimuth head, and B1, ... are those of the minus azimuth head.

Therefore, the reproduced outputs by the two heads as shown in FIG. 2(b) are such that for A1 field, tracks a1 and a1 are reproduced, for B1 field, b2 and for A2 field, a2 and a3. In other words, in A1 and A2 fields, the crosstalk components of the adjacent two are detected, so that the reproduction level is lowered as compared with that in B1 field.

Then, by comparing the reproduced output with a prescribed threshold level S, comparison output pulses are obtained as shown in FIG. 2(c). These pulses repeat at a rate of one per 2 fields. FIG. 3 is a diagram of another case where recording has been operated in the standard mode, and reproducing is operated in the long time mode. As shown in FIG. 3(a), azimuthrecorded tracks b1 - a1 - b2 - a2 and so on are reproduced by azimuth-reproducing heads of the same width as that of the recording heads as A1 - B1 - A2 - B2 - A3 - B3 and so on. In F1 field, the same azimuth track a1 is reproduced. In B1 field, track b1 is reproduced. In A2 field, track a1 is reproduced. The reproduced output levels become the same as just $\frac{1}{2}$ times slow reproducing is operated. Upon comparison with a prescribed threshold level S, one pulse for every 4 fields is obtained (FIG. 3(c)).

FIG. 4 illustrates another case where, though similarly to FIG. 3, the magnetic tape which has been run in the standard mode during recording is run in the long time mode during reproduction, the width of the reproducing azimuth head is a half of that of the recording head.

When the azimuth recorded tracks are reproduced by the azimuth head, as shown in FIG. 4(b), almost no reproduced outputs are obtained in the B1 and B3 fields. Therefore, as shown in FIG. 4(c), similarly to FIG. 3(c), at a rate of once per 4 fields, comparison output pulses are obtained, and also in the picture display, one noise bar in 4 fields is produced.

Of course, when the running speeds in the recording are the same, both of the comparison output pulse and the noise bar do not take place.

Figures 5A, 5B:
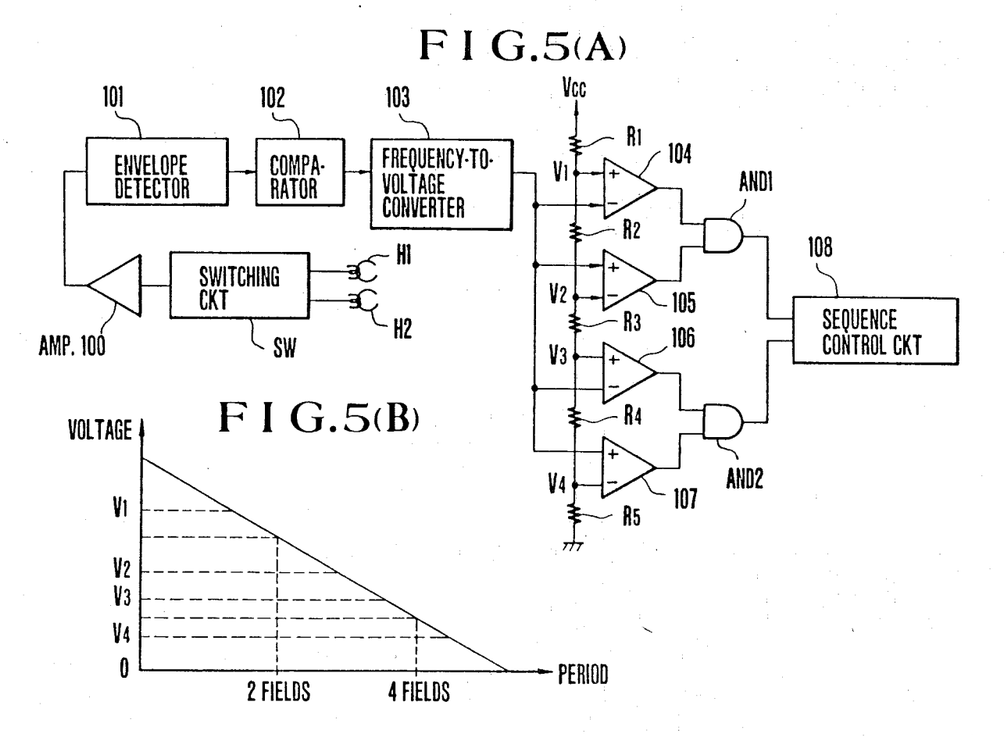
FIG. 5(A) is an electrical circuit diagram of a detector for detecting difference in running speed between recording and reproduction in the first embodiment of the invention.
FIG. 5(B) is a graph illustrating variation of the output of the frequency-to-voltage converter circuit 103 of FIG. 5(A).

FIG. 5(A) illustrates an embodiment of a detector circuit for detecting differences in the running speed. H1 is a plus azimuth head; H2 is a minus azimuth head; SW is a switching circuit for changing over between the heads H1 and H2; 100 is an amplifier; 101 is an envelope detector; 102 is a comparator for comparison with a threshold level; 103 is a frequency-to-voltage converter circuit; 104-107 are window comparators; AND1 and AND2 are AND gates; and R1 to R5 are resistors.

The reproduced outputs from heads H1 and H2 are amplified by amplifier 100, and reproduction envelope signals are supplied by envelope detector 101. The envelope signal is compared with the prescribed threshold value by comparator 102 to obtain periodic noise bar detection pulses as shown on lines (c) in FIGS. 2, 3 and 4. The detection pulses are converted by converter circuit 103 to a voltage proportional to the reciprocal of the period as shown in FIG. 5(B), and then applied to one of two inputs of each of comparators 104 to 107, the other inputs of which are supplied with respective reference voltages V1 to V4 from a voltage divider of resistors R1 to R5 across an electrical power source or battery Vcc. When the output voltage of converter 103 lies between V1 and V2, the output of AND1 takes high level, and when between V3 and V4, the output of AND2 takes high level. In other words, when one noise bar in every two fields is detected, AND gate AND1 produces an output of high level indicating that while recording was in the long time mode; reproducing is in the standard mode. When once in every four fields, AND gate AND 2 produces an output of high level, indicating detection of the fact that while recording was in the standard mode, reproducing is in the long time mode.

These outputs are applied to sequence control circuit 108.

Figure 6:
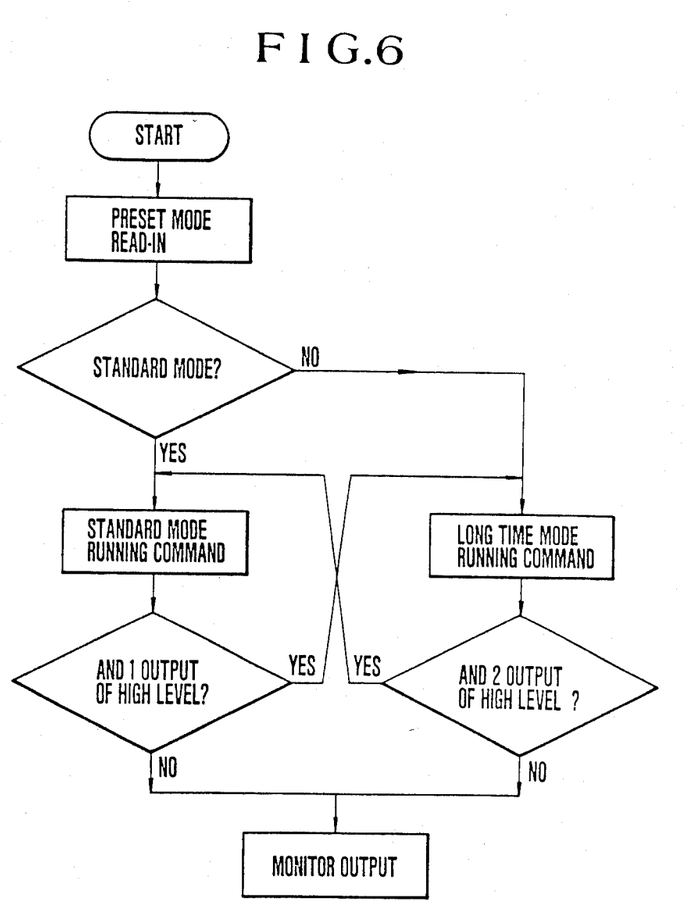
FIG. 6 illustrates part of a program of the sequence control circuit of FIG. 5(A).

FIG. 6 is a diagram illustrating part of a program of the sequency control circuit 108.

At first, the mode preset by the user is read in and whether it is the standard mode or the long time mode is determined. In the case of the standard mode, the tape is caused to run in the standard mode to examine whether or not the output of AND1 is high level. Upon detection of a low level from AND1, the reproduced video signals are applied to a TV monitor without further alteration. Upon detection of the high level, the long time mode is operated. Also, in the case where the preset mode is the long time mode, the tape is caused to run at a speed corresponding to the long time mode, and whether or not the output of AND2 is high level is examined. Upon detection of low level from AND2, the reproduced video signals are applied without further alteration to the TV monitor. Upon detection of the high level, the tape is caused to run in the standard time mode. By this, the same mode as that used during recording is rendered operative during reproduction, thereupon a noise-bar-free picture is obtained on the TV monitor.

It should be noted that though the foregoing embodiment has been described in connection with the ratio of the running speed of the tape during recording to that during reproduction taken at 2:1 or 1:2, it is, of course, possible to achieve such detection for other values of the running speed ratio.

It should also be noted that though the period of the noise bar detected pulses is sensed by using a frequency-to-voltage converter, it is of course possible to use a timer circuit or other suitable means for the detecting purposes.

Also, though the foregoing embodiment has been described taking as the reproducing apparatus an example of an apparatus for reproducing a magnetic tape which was azimuth-recorded, the invention is applicable to another or optical type reproducing apparatus, provided that a difference between the recording and reproducing speeds results in aberration from the recording tracks. For, if so, the reproduced output level varies periodically, detection of its period enables adjustment of the reproducing speed.

Next described is a second embodiment of the invention.

Figure 7:
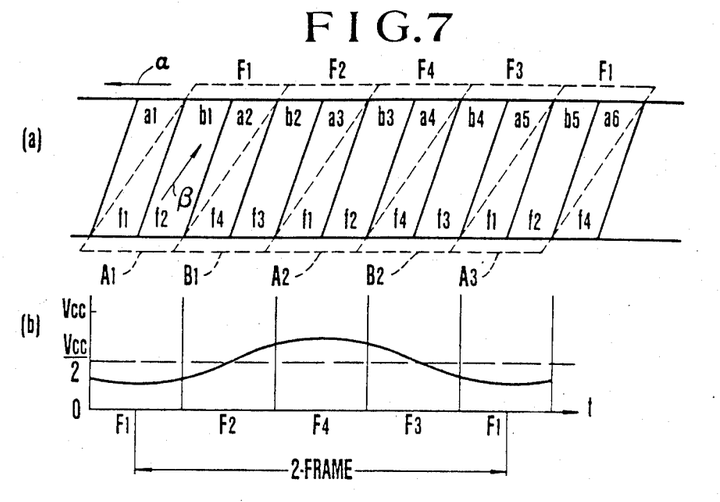
FIG. 7, (a) and (b), is a diagram of a second embodiment of the invention where the tape which was run in the long time mode during recording is run in the standard mode during reproduction.
Figure 8:
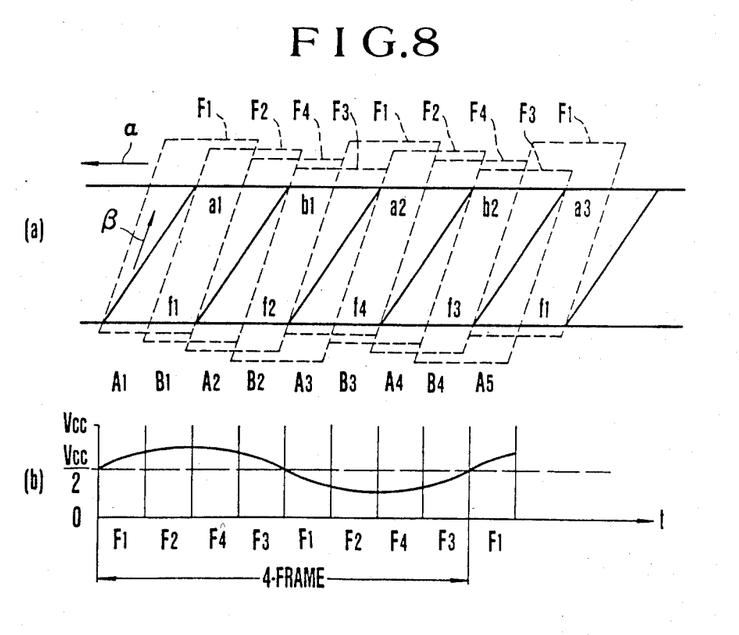
FIG. 8, (a) and (b), is similar to FIG. 7 except that the tape which was run in the standard mode during recording is run in the long time mode during reproduction.

FIGS. 7 and 8 are principle diagrams for explaining the second embodiment.

FIG. 7(a) illustrates recording tracks on a magnetic tape, where a1, a2, . . . are those of the tracks which have been recorded by the plus azimuth recording head, and b1, b2, ... are the others which have been recorded by the minus azimuth recording head, and these tracks alternate as a1 - b1 - a2 - b2 - a3 - b3 and so on in the long time mode.

It is to be noted here that for each of tracks a1, a3, a5, . . . a pilot signal of frequency f1 has been recorded in superimposing relation on the video signals, for each of tracks b1, b3, b5, . . . another pilot signal of frequency f2, for each of tracks a2, a4, a6, . . . another pilot signal of frequency f4, and for each of tracks b2, b4, b6, . . . another signal of frequency f3. The frequencies f1, f2, f3 and f4 have relationships: $f1 < f2 < f3 < f4$, $f2 - f1 = f4 - f3 = f5$; $f4 - f2 = f3 - f1 = f6$; and $f5 \neq f6$. When the f1, f2, f3 and f4 pilot signal-recorded tracks are individually reproduced, those of the pilot signals which have been recorded in the adjacent tracks are reproduced as crosstalk components. By multiplying the reproduced output by the one of signals F1, F2, F3 and F4 which has the same frequency as the pilot signal in the track being reproduced, the crosstalk components are extracted as signals of the frequencies f5 and f6. Then, the levels of the signals f5 and f6 are compared with each other to obtain a tracking control signal (hereinafter referred to as "ATF" signal). The foregoing description is made as an example of the method for obtaining "ATF" signal. In this connection, it should be pointed out that the frequencies of the signals to be superimposed on the video signals may be combined in another different way, and many other combinations can be considered.

Now suppose that such recorded tracks are reproduced at a faster running speed (standard mode) than the recording speed (long time mode). In FIG. 7(a), the head tracing paths during reproduction in the standard mode are shown by dashed lines with an arrow $\alpha$ indicating the direction in which the tape is run and another arrow $\beta$ indicating the direction in which the head scans. Also the running speed of the tape in the long time mode is assumed to be a half of that in the standard mode, and the width of the reproducing head for the standard mode is assumed to be 2 times that of the recording head for the long time mode. With such arrangement, when tracing at the tape speed for the standard mode, the track pattern on the tape does not match the inclination of the path of the reproducing head, and moreover no correspondence between the reproduced output of the pilot signal (f1-f4) recorded in the track to be reproduced and the frequency signal (F1-F4) to be mixed with the reproduced output can be taken. For this reason, as shown on line (b) in FIG. 7, the "ATF" signal varies by a period of 2 frames. Referring to FIG. 7(a), if the reproducing head scans B2 field, because the frequency signal to be multiplied during scanning of the B2 field is F3, the "ATF" signal would control the phase of rotation of the capstan so that among the tracks on which the pilot signal of the same frequency as that of the signal F3, the nearest track b4 to the B2 is to be reproduced. However, because the direction of movement of the reproducing head is different from the direction of path of the track by the aforesaid reason, it results that where a good tracking condition is attained during B2 field is at only an intermediate point in the B2 field. And at the start point of scanning the B2 field, the pilot signal f4 in the preceding adjacent track a4 is largely reproduced, and at the terminal point of scanning, the pilot signal f1 in the following adjacent track a5 is largely reproduced. As a result, the ATF output takes a high level at the start point in order to speed up the tape movement, and a low level at the terminal point in order to slow down the tape movement.

Now assuming that, as usual, the voltage of the ATF output is Vcc/2 when the good tracking condition is attained, then the ATF output represents a vibrating waveform of 2-frame period with Vcc/2 at the center.

FIG. 8 illustrates a mistracking condition resulting from the use of the long time mode during reproduction despite recording having been performed in the standard mode. What is different from FIG. 7 is that the mistracking condition repeats itself in a period of just 4 frames. Therefore, the ATF output vibrates by the 4-frame period as shown on line (b) in FIG. 8. In conclusion, when reproducing is operated at a different speed of tape movement from that at which the tape was run during recording, the ATF output signal varies its magnitude periodically.

Figure 9:
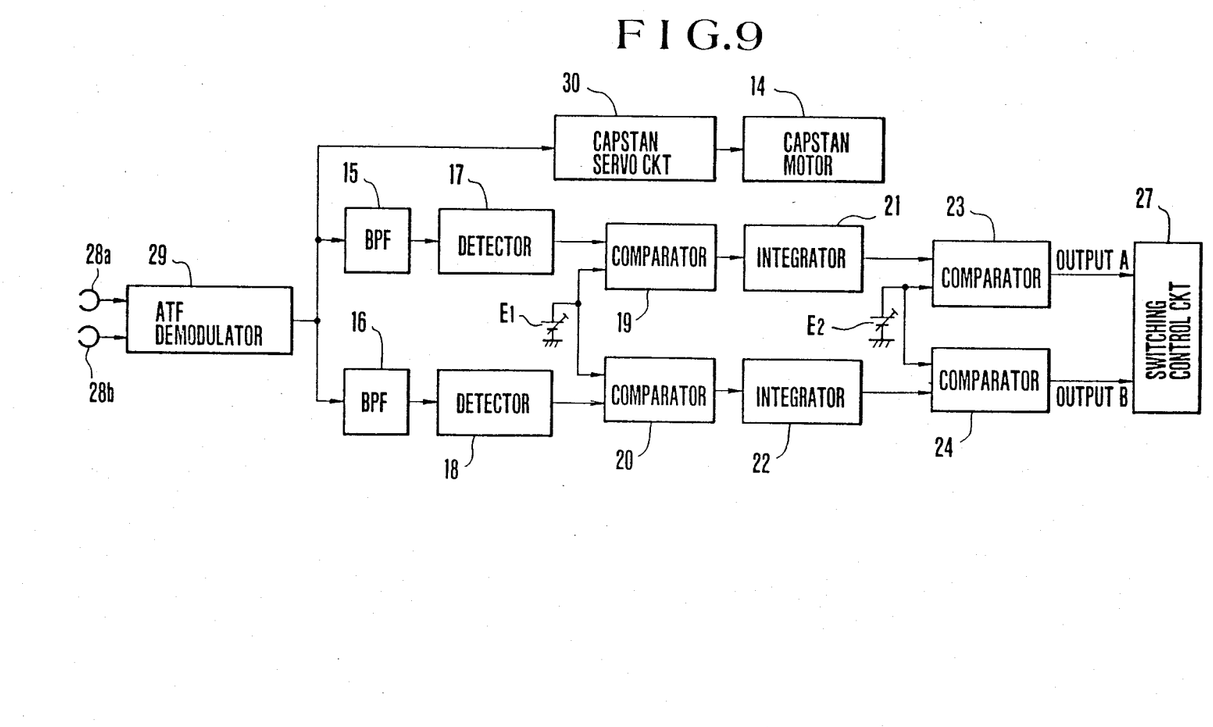
FIG. 9 is an electrical circuit diagram of a detector for detecting difference in running speed between the recording and reproduction in the second embodiment of the invention.

FIG. 9 is a block diagram of a fundamental circuit of putting the above-described principles into practice. 28a and 28b are reproducing heads; 29 is a demodulator circuit of known construction for obtaining the ATF signal from the pilot signals (f1-f4) for tracking reproduced by the reproducing head 28a, 28b (detailed, for example, in the specification of U.S. Pat. No. 4,297,733); 30 is a rotation control servo circuit for capstan motor 14; 15 and 16 are band pass filters for extracting only 2-frame and 4-frame periodic signals, respectively; 17 and 18 are rectifier and detector circuits therefor; 19 and 20 are comparators cooperating with a constant voltage source 25 of adjustable output voltage E1; 21 and 22 are integrator circuits; 23 and 24 are comparators cooperating with a constant voltage source of adjustable voltage E; and 27 is a switching control circuit for changing over the tape running speed.

The ATF signal from the ATF demodulator circuit 29 is directed not only to the capstan servo circuit but also to the band pass filter BPFs 15 and 16 where only the signals of 2-frame period and 4-frame period (in the case of the NTSC signal reproducing VTR, 15 Hz and 7.5 Hz, respectively) are allowed to pass therethrough to detectors 17 and 18. The outputs of detectors 17 and 18, in the form of direct current signals, because of their including simple noise components, are compared with the threshold voltage E1 by comparators 19 and 20. When above E1 level, the outputs of comparators 19 and 20 are averaged by integrator circuits 21 and 22. Then only when the outputs of integrators 21 and 22 exceed the threshold voltage E3, comparators 23 and 24 produce outputs A and B of high level, respectively. When the output A is of H level, it is found that the tape which was run at the long time mode during recording, is reproduced at the standard speed. When the output β is of H level, the tape which was run at the standard speed during recording, is being reproduced in the long time mode. Of course, when what has been recorded in the standard mode is reproduced in the same mode, or when what has been recorded in the long time mode is reproduced in the long time mode, both of the outputs A and B do not become H level, as a matter of course. The outputs A and B are applied to the switching control circuit 27 controlling the running speed of the tape in accordance with the outputs A and B.

Figure 10:
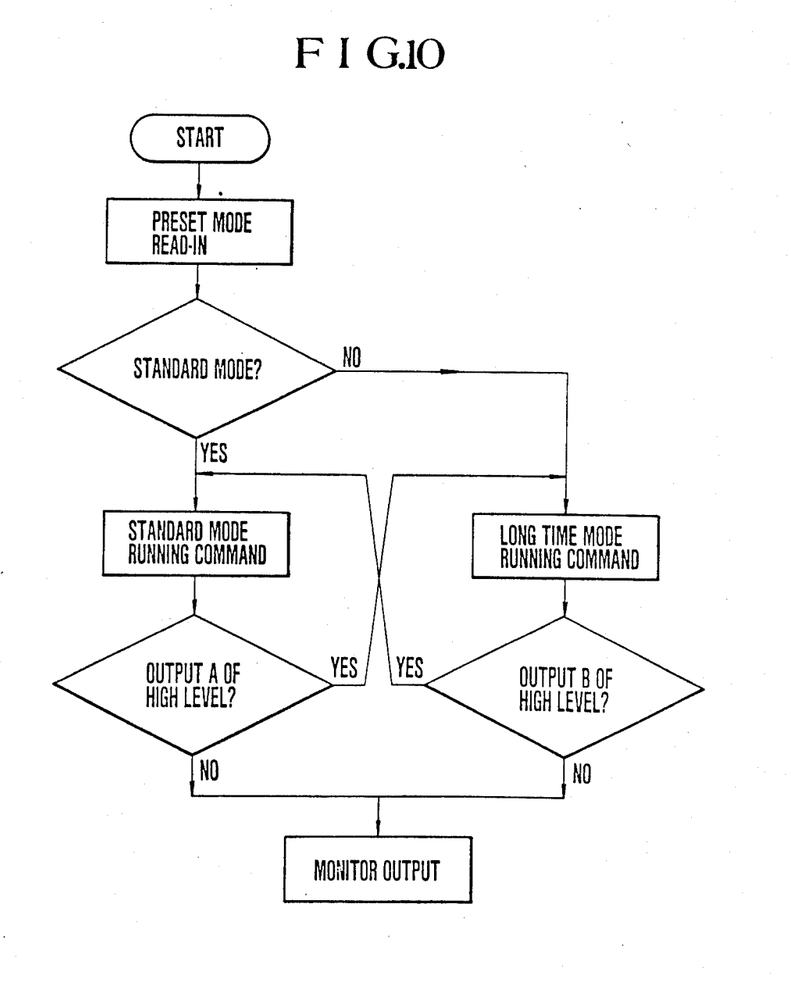
FIG. 10 illustrates a program of the switching control circuit of FIG. 9.

FIG. 10 illustrates part of a program for switching control circuit 27.

At first, the mode preset by the user is read in, and whether it is the standard mode or the long time mode is determined. In the case of the standard mode, the tape is caused to run at the normal speed. Then, whether or not the output A is of high level is examined. Upon detection of the output A of low level, the reproduced video signals are emerged to a TV monitor without further alternation. Upon detection of high level, the speed of the tape movement is changed to the slow one. In the case of the long time mode presetting, the tape is caused to run at the slow speed corresponding to the long time mode, while whether or not the output B is of high level is examined. Upon detection of the output B of low level, the reproduced video signals are applied without further alternation to the TV monitor. Upon detection of high level, the speed of tape movement is changed to the standard one. Thereby only after the same mode when recording was performed is set up during reproduction, noise bar free, near pictures are obtained on the TV monitor.

It should be noted that though the foregoing embodiment has been described in connection with the ratio of the tape speed in the standard mode to that in the long time mode taken at 2:1, generally speaking, by the ratio of N:1 (where N is an integer), it is when the tape is run at N times faster a speed than the required one during reproduction that the ATF output signal varies by a period of 2/(n−1), and it is when at 1/N times faster a speed, that the period is 2N-frames. Therefore, as BPFs 15 and 16, those having transmittance in frequencies of 15 Hz and 15/N Hz, respectively, must be selected to use. So long as this requirement is fulfilled, the present invention is applicable to any type reproducing apparatus where the speed ratio is other than 2:1, or three or more different reproduction speeds are provided. Also, though in this embodiment as the technique of detecting the periodic variation ofo the ATF output signal, use is made of BPFs and detector circuits, it is also possible that the ATF output is passed through an LPF to reduce noise, then pulses are formed at points when the ATF output goes across Vcc/2, then the time interval between the successive two pulses is converted to a voltage by the frequency-to-voltage converter, and then the outputs A and B are obtained by the window comparators.

Also, though in this embodiment, the ATF signal itself is utilized, the difference between the recording and reproducing speeds can be otherwise detected by sensing the level of the frequency signal such as f2 - f1, or f4 - f2 in the front stage. It is also possible to detect the difference between the recording and reproducing speeds by the reproduced period of one pilot signal out of the frequencies f1, f2, f4 and f3.

Also, though the foregoing embodiment has been described in connection with the use of four pilot signals of different frequencies (f1–f4) during recording, the present invention is applicable to all other type reproducing apparatus, provided that from the tape on which pilot signals of different frequencies have been recorded in adjacent tracks are reproduced the pilot signals to obtain the tracking signal.

As has been described in greater detail above, according to the present invention, even with the recording medium having no CTL signals recorded thereon, coincidence or difference between the recording speed (the running speed of the recording medium during recording) and the reproducing speed (the running speed of the recording medium during reproduction) is made possible to detect by the reproduced output of reproducing means for reproducing information signals.

Also by using its detected output, it is possible to automatically bring the reproducing speed into coincidence with the recording speed.

It is to be understood that the present invention is not limited to the above-described embodiments, and that many applications and variations are possible within the spirit and scope of the invention construed in the appended claims.

What we claim:

1. A reproducing apparatus for reproducing information signals from recording tracks formed on a tape-shaped recording medium, comprising:
    (a) transporting means for selectively transporting said tape-shaped recording medium at one of at least two different running speeds for the purpose of reproducing said information signals;
    (b) reproducing means for reproducing said information signals recorded on said recording tracks of said tape-shaped recording medium as it is transported by said transporting means, said reproducing means having at least one rotating head;
    (c) first information forming means for forming a first information indicating a distance and a direction of the position of said rotating head relative to said recording tracks by using output signals of said rotating head;
    (d) second information forming means for forming a second information indicating a varying period of said first information; and (e) discriminating means for discriminating whether or not the running speed of said transporting means is coincident with the recording speed of said information signals based on the varying period indicated by said second information.

2. An apparatus according to claim 1, wherein said second information forming means includes a frequency to voltage converting circuit.

3. An apparatus according to claim 2, wherein said first information forming means includes an envelope detecting circuit for the output signals of said rotating head.

4. A reproducing apparatus for reproducing information signals from a tape-shaped recording medium on which a plurality of pilot signals of different frequencies for tracking control and the information signals are recorded in superimposing relation, comprising:
(a) transporting means for selectively transporting said tape-shaped recording medium at one of at least two different running speeds for the purpose of reproducing said information signals;
(b) reproducing means for reproducing said information signals and said pilot signals recorded on said tape-shaped recording medium as it is transported by said transporting means, said reproducing means having at least one rotating head;
(c) detection means for detecting a characteristic component generated in a signal related to the reproduced output of said pilot signal at each period related to the rotating period of said rotating head on the basis of a fact that the transporting speed of said transporting means is not coincident with the recording speed of said information signal; and
(d) discrimnating means for determining whether or not the running speed of said transporting means is coincident with the recording speed of said information signals, on the basis of a plurality of times of the detection of the characteristic component.

5. An apparatus according to claim 4, wherein said detection means includes a signal forming means for forming a tracking control signal from the reproduced output of said pilot signal and a finding means for finding a component having a predetermined frequency from said tracking control signal.

6. An apparatus according to claim 4, wherein said detection means includes a signal forming means for forming a signal related to the characteristic component, and a comparison means for comparing a level of the signal formed by said signal forming means.

7. An apparatus according to claim 6, wherein said discriminating means includes an integrator for integrating a binal signal output from said comparison means.

8. A reproducing apparatus for reproducing information signals from a tape-shaped recording medium on which four kinds of pilot signals of different frequencies for tracking control, and information signals are recorded in superimposing relation, said pilot signals being selectively recorded on a predetermined rotation irrespective of the recording speed of the information signals, said reproducing apparatus comprising:
(a) transporting means for selectively transporting said tape-shaped recording medium at one of at least two different running speeds for the purpose of reproducing said information signals;
(b) reproducing means for reproducing said information signals and said pilot signals recorded on said tape-shaped recording medium as it is transported by said transporting means;
(c) tracking control means for obtaining a tracking control signal from the reproduced output of said pilot signals; and
(d) discriminating means for determining whether or not the running speed of said transporting means is coincident with the running speed used during recording of said information signals based on said tracking control signal.

9. A reproducing apparatus according to claim 8, further comprising transportation control means responsive to an output of said discriminating means for changing the running speed of said transporting means.

10. A reproducing apparatus for reproducing information signals from a tape-shaped recording medium on which four kinds of pilot signals of different frequencies for tracking control and information signals are recorded in superimposing relation, said pilot signals being selectively recorded at a predetermined rotation irrespective of the recording speed of the information signals, said reproducing apparatus comprising:
(a) transporting means for transporting said tape-shaped recording medium with selection of at least two different running speeds for the purpose of reproducing said information signals;
(b) reproducing means for reproducing said information signals and said pilot signals recorded on said tape-shaped recording medium as it is transported by said transporting means; and
(c) discriminating means for discriminating whether or not the running speed of said transporting means is coincident with the recording speed of said information signals, by the produced output of said pilot signals.

11. A reproducing apparatus according to claim 10, further comprising:
transportation control means responsive to the detected output of said discriminating means for changing over the running speed of said transporting means.

* * * * *